March 15, 1960 R. F. CASEY 2,929,029

AMPLITUDE DISCRIMINATIVE AMPLIFIER

Filed Oct. 11, 1955

INVENTOR
ROBERT F. CASEY
BY William S Glover
AGENT

United States Patent Office 2,929,029
Patented Mar. 15, 1960

2,929,029

AMPLITUDE DISCRIMINATIVE AMPLIFIER

Robert F. Casey, Pompton Plains, N.J., assignor to Monroe Calculating Machine Company, Orange, N.J., a corporation of Delaware Application October 11, 1955, Serial No. 539,717

3 Claims. (Cl. 330—173)

This invention relates to new and useful improvements in amplitude-discriminative D.C.-coupled electronic amplifier circuits.

In electronic equipment such, for example, as magnetic digital recording systems, it is common to use complex variable signal trains to effect differential operation of detection or other circuits. In some equipment the signal trains represent intelligence and are made up of pulses of opposite polarity which serve, when amplified, to effect alternative modes of operation of detection means. Relatively low-level noise occurring in the transitional periods between pulses of trains such as these, may be amplified along with the pulses, particularly where high gain amplifier circuits are utilized, and may produce spurious operations of the detection means which introduce erroneous items into the intelligence represented by the train. Generally, D.C.-coupled amplifier circuits are used in such equipment to obviate signal distortion due to recharging of coupling capacitors by signals before they have completely recovered from the effects of previously applied noise. The intelligence may be further garbled in these circuits as the result of low-frequency drift of the D.C. level of the signal train away from the operating level of the circuits.

In order to prevent the propagation of garbled intelligence various error-detection systems such as the well-known "parity bit-check" have been incorporated in such equipment at considerable expense. These systems have proven effective in detecting errors but are incapable of correcting the errors. Thus, additional measures must be taken to discard the garbled intelligence and to replace it with a copy of the original ungarbled intelligence if such is available. Obviously these expedients constitute only a partial solution to the problem.

The principal object of the invention, therefore, is the provision of a high-gain D.C.-coupled amplifier circuit capable of amplifying the pulses of a signal train while attenuating relatively low-level noise occuring in the transitional periods between pulses, which means are insensitive to low-frequency drift of the D.C. level of the signal train.

According to the invention, the grids of a pair of triodes are maintained at the same D.C. level through a resistive coupling but the grid of one triode is A.C.-short-circuited to ground so that the A.C. components of signals applied to the grid of the second triode have relatively no effect thereon. The cathodes of the triodes are connected to negative supply through voltage dividers, and each is connected to the tap of the other's divider through a unidirectionally conductive element.

The first triode operates as a cathode-follower while the second comprises a cathode-coupled grounded-grid amplifier. The grounded-grid amplifier produces output signals only when the input signals are of sufficient magnitude to raise the potential of the tap of the cathode-followers' divider above that of the cathode of the amplifier; or to lower the potential at the cathode of the cathode follower below that at the tap of the amplifier's divider. The unidirectionally conductive elements do not conduct for signals or noise of lesser magnitude and these are not reproduced in the ouput. In a modified form of the invention the unidirectional conductive elements are replaced by a varistor connected between the cathodes of the triodes and the dividers may be replaced by resistors. This form of the invention provides a smoother transition between signal amplitudes subject to amplification and those subject to suppression.

This and other objects and features of the invention will become apparent from the following description when read in the light of the drawings, of which:

Figure 1:
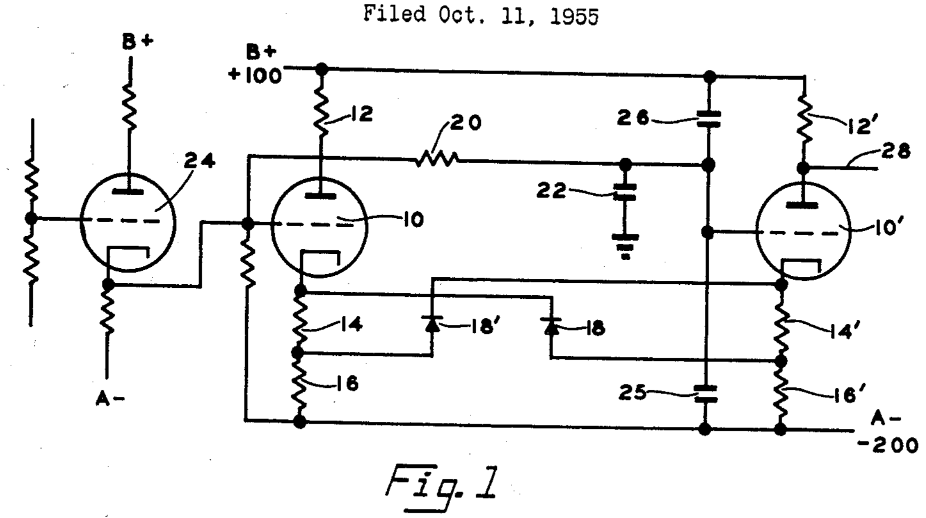
Fig. 1 is a wiring diagram of the means of the invention.

Referring to Fig. 1, there is illustrated a triode 10 having its anode connected to a source of positive potential through a resistor 12 and its cathode connected to a source of negative potential through a pair of resistors 14 and 16. A second triode 10′ is connected in the same fashion with resistors 12′, 14′ and 16′ which may be identical to their unprimed counterparts. A rectifier 18 is connected between the cathode of triode 10 and the juncture of resistors 14′ and 16′, the cathode of the rectifier being coupled to that of the triode. A second rectifier 18′ is connected in like manner between the cathode of triode 10′ and the juncture of resistors 14 and 16. An integrating circuit comprising a resistor 20 and a capacitor 22 connects the grids of the two triodes. Preferably capacitor 22 is connected to ground.

Pulsating signals may be supplied to the described circuit from any suitable source. As illustrated in Fig. 1 such signals are provided by a cathode-follower which preferably, applies a potential of approximately zero voltage to the grid of triode 10 in the absence of a signal.

No independent D.C. path to ground is provided for the grid of triode 10′. Thus no voltage drop is encountered across resistor 20 and the grid of triode 10′ always assumes approximately the same D.C. level as the grid of triode 10. This immunizes the circuit against drift of the D.C. level of the applied signals. In order to prevent the A.C. components of the applied signal from affecting triode 10′ significantly, the magnitude of capacitor 22 is selected to attenuate such components to approximately zero. This feature is further enhanced by choosing the magnitudes of the resistors 12′, 14′ and 16′ such that the sum of the magnitudes of resistors 14′ and 16′ is much greater than that of resistor 12′ Thus, any A.C. component which does appear at the grid of triode 10′ is further attenuated. At the same time the ratio between the magnitude of the resistors 14′ and 16′ (and also that between resistors 14 and 16) is selected to provide the desired degree of signal slicing.

The operation of the circuit will now be described.

Normally triodes 10 and 10' are conducting and rectifiers 18 and 18' are cut off. Production of a signal by triode 24, for example, that indicated on the upper line of Fig. 2, drives the grid of triode 10 alternatively positive and negative and to a much smaller extent (if at all) similarly affects the grid of triode 10'. When the grid of triode 10 swings positively the cathode potential of the latter rises also, through cathode-follower action, and the potential at the juncture of resistors 14 and 16 is raised until it assumes a value approximately equal to that of the cathode of triode 10'. At this time rectifier 18' conducts and triode 10' becomes a cathode-coupled grounded-grid amplifier. Any further rise of the signal effecting a corresponding rise in the potential of the cathode of triode 10' decreases the rate of conduction of the latter and produces a positively directed potential swing on an output line 28 extended from the anode thereof (middle line, Fig. 2). If then, the input signal swings negatively the potential at the juncture of resistors 14 and 16 drops as does that of the cathode of triode 10', and when the potential at said juncture drops below that of said cathode, the rectifier 18' is cut off. At the same time the potential of output line 28 also drops to its normal value. As the signal swings even further negatively the potential at the cathode of triode 10 drops to a value approximately equal to that at the juncture of resistors 14' and 16' at which time rectifier 18 conducts. Any additional negative swing of the signal reduces the potential of the cathode of triode 10' and, by increasing the plate current of the latter, lowers the potential of output line 28 (middle line, Fig. 2).

The percentage of input signal which is sliced away depends upon the voltage drops which are effected across the resistors 14 and 14'. For example, if it is desired to eliminate or slice away all those portions of an input wave which are of less than any given magnitude, say + or −10 volts, than a voltage difference of approximately 10 volts must be exhibited across each of the resistors 14 and 14' to prevent conduction of the rectifiers 18 and 18' by signals of lesser magnitude. Thus triode 10' reacts as a cathode-coupled amplifier only to those portions of an applied signal which are of greater magnitude than ten volts.

As shown in Fig. 1 the circuit of the invention may include means to severely attenuate noise introduced via the negative bias and B+ supplies. This means takes the form of coupling condensers 25 and 26 connected between the grid of triode 10' and said supplies. The capacitors form A.C. short circuits to the grid for noise introduced through the supplies which, therefore, affects the grid of triode 10' substantially the same as it affects the grid of triode 10 to which it is applied along with the signal. This conditions the circuit to act as a differential amplifier, that is, variations at the cathode of triode 10' caused by noise introduced through triode 10 are offset by the effects of this same noise on the grid of triode 10'.

It is to be pointed out that the capacitors 25 and 26 also short-circuit to ground the A.C. components of the applied signal which appear on the grid-to-grid connection between the triodes 10 and 10', it being assumed that the B+ and negative bias supplies are of sufficiently low impedance to simulate ground. In some instances this effect is all that is required to completely block application of the A.C. components of the input signals from the grid of triode 10'. Where this is the case the capacitor 22 may be eliminated.

Figures 2, 3:
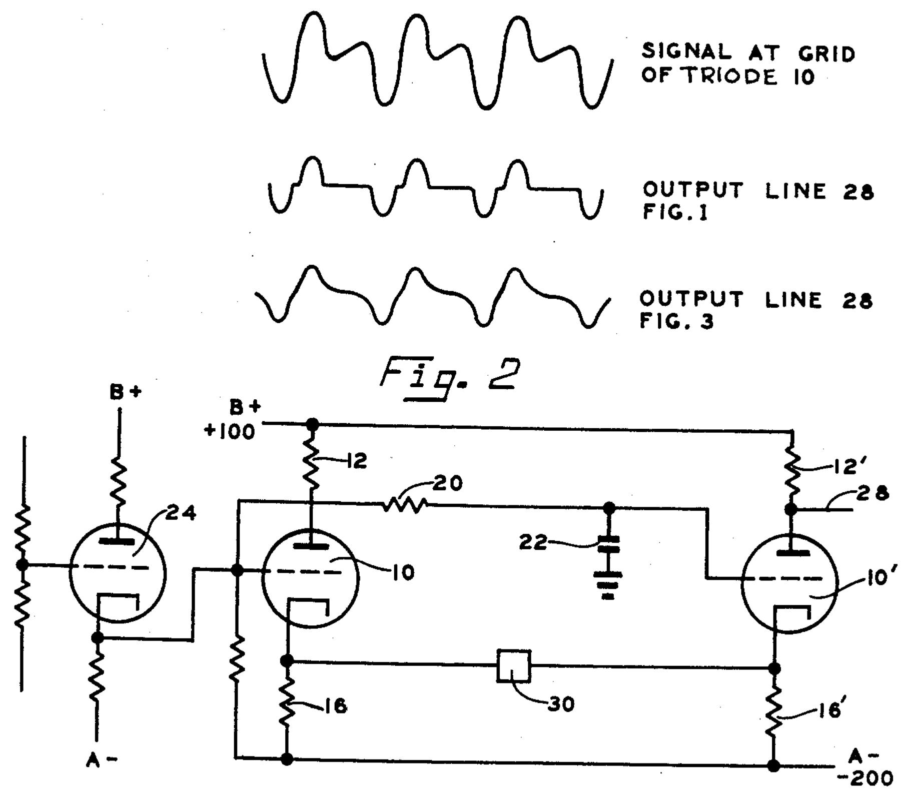
Fig. 2 is a wave diagram illustrating the operation of the means of the invention.
Fig. 3 is a wiring diagram of a modified form of the invention.

A simplified form of the invention is illustrated in Fig. 3 wherein the rectifiers 18 and 18' of Fig. 1 have been replaced by a varistor 30, such as thyrite, and the resistors 14 and 14' have been eliminated. If desired, the condensers 25 and 26 could also be included in the circuit.

The exponentially non-linear resistance characteristic of thyrite is well-known and need not be described at length herein, it being sufficient to point out that the resistance of thyrite at zero voltage is practically infinite, but drops to, say, a few hundred ohms, in the case of varistor 30, at an 8-volt signal level.

The operation of the circuit of Fig. 3 is substantially identical with that of Fig. 1 and is illustrated on the bottom line of Fig. 2. The most significant difference between the operation of the two circuits is that whereas the rectifiers 18 and 18' provide a relatively sharp line of demarcation between signal magnitudes which are subject to attenuation and to amplification, varistor 30 provides for a smooth transition between the two conditions. Stated otherwise, the rectifiers 18 and 18' clip all of the applied signal which is of smaller magnitude than the voltage difference across the resistors 14 and 14', but the varistor provides attenuation of that portion of the applied signal which is less than a given magnitude, say 8 volts, to a degree that varies exponentially from substantially 100% attenuation in the zero-volt region to very little attenuation at an 8-volt level. The varistor displays practically a short-circuit characteristic to those portions of the signal which exceed the given level, much the same as do the rectifiers 18 and 18'.

Typical components for the circuits of Figs. 1 and 3 may comprise:

| | |
|---|---|
| Triodes **10** and **10'** | Type 5965. |
| Resistors **12** and **12'** | 6.8K ohm. |
| Resistors **14** and **14'** | 680 ohms. |
| Resistors **16** and **16'** | 30K ohms. |
| Resistor **20** | 0.5 megohm. |
| Capacitor **22** | 220 mmfd. |
| Capacitors **25** and **26** | 1000 mmfd. |
| Rectifiers **18** and **18'** | Type 1N67. |
| Varistor **30** | G.E. Cat. No. 8396839G1, 2.5K @ 5 v., Eyp 4. |

While there has been above described but a limited number of embodiments of the invention it is believed evident that many additions and modifications may be made therein without departing from the spirit of the invention and it is not desired, therefore, to limit the scope of the invention except as pointed out in the appended claims or as dictated by the prior art.

I claim:

1. An amplifier circuit comprising, a first triode operated as a normally conducting cathode follower, a second triode operated as a normally conducting amplifier, means interconnecting the grids of said triodes, means for applying input signals to the grid of said first triode, means for short-circuiting A.C. components of signals connected to the grid of said second triode, means connecting the output of said first triode to the cathode of said second triode, an output connected to the anode of said second triode, said triodes being connected between sources of anode and cathode supply, said means connecting the output of said first triode to the cathode of said second triode including a pair of voltage dividers each connecting the cathode of a respective triode with the cathode supply source, each divider having a tap, and a pair of rectifiers each having its cathode connected to the cathode of one of the triodes and its anode connected to the tap of the divider with the other triode.

2. The amplifier circuit according to claim 1, said short-circuiting means comprising capacitive means for short-circuiting A.C. signals transmitted from the anode and cathode supply sources respectively connected between the grid of the second triode and the anode and cathode supply sources.

3. An amplifier circuit comprising, a first triode operated as a normally conducting cathode follower, a second triode operated as a normally conducting amplifier and having its cathode connected to a source of negative potential, means interconnecting the grids of said triodes, means for applying input signals to the grid of said first triode, means for short-circuiting A.C. components of signals connected to the grid of said second triode, means connecting the output of said first triode to the cathode of said second triode, an output connected to the anode of said second triode, said means connecting the output of said first triode to the cathode of said second triode comprising first and second rectifiers having their cathodes connected to the cathodes of said first and second triodes, respectively, and a pair of resistors connecting the anodes of said first and second rectifiers with the cathodes of said first and second triodes, respectively.

References Cited in the file of this patent

UNITED STATES PATENTS 2,697,168 Spaulding ---------------- Dec. 14, 1954
2,737,547 Deming ------------------ Mar. 6, 1956
2,782,264 Dodd et al. --------------- Feb. 19, 1957

FOREIGN PATENTS 529,044 Great Britain ------------ Nov. 13, 1940
709,035 Germany ----------------- Aug. 4, 1941